US012520372B2

(12) United States Patent
Chang et al.

(10) Patent No.: US 12,520,372 B2
(45) Date of Patent: Jan. 6, 2026

(54) LOCAL BROADCAST TO TRIGGER RACH PROCEDURE AS PART OF INITIATION OF COLLISION-AVOIDANCE PROCEDURE

(71) Applicant: Kyocera Corporation, Kyoto (JP)

(72) Inventors: Henry Chang, San Diego, CA (US); Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 594 days.

(21) Appl. No.: 17/790,938

(22) PCT Filed: Jan. 15, 2021

(86) PCT No.: PCT/US2021/013551
§ 371 (c)(1),
(2) Date: Jul. 5, 2022

(87) PCT Pub. No.: WO2021/146504
PCT Pub. Date: Jul. 22, 2021

(65) Prior Publication Data
US 2023/0031495 A1 Feb. 2, 2023

Related U.S. Application Data

(60) Provisional application No. 62/961,825, filed on Jan. 16, 2020, provisional application No. 62/961,831, filed on Jan. 16, 2020.

(51) Int. Cl.
H04W 76/28 (2018.01)
G08G 1/16 (2006.01)
(Continued)

(52) U.S. Cl.
CPC ....... *H04W 76/28* (2018.02); *H04W 52/0216* (2013.01); *H04W 72/20* (2023.01);
(Continued)

(58) Field of Classification Search
CPC .......................... H04W 74/085; H04W 76/14
See application file for complete search history.

(56) References Cited

U.S. PATENT DOCUMENTS 9,736,847 B2 * 8/2017 Feng ................... H04L 63/0428
9,986,440 B2 5/2018 Guvenc
(Continued)

FOREIGN PATENT DOCUMENTS

WO WO-2014161155 A1 * 10/2014 ............. H04L 9/083
WO 2017-171897 A1 10/2017

*Primary Examiner* — Parth Patel

(57) ABSTRACT

The methods, devices, and systems discussed herein involve a mobile wireless communication device (WCD) receiving a signal containing an indicator upon entering a first area that is near a potential safety scenario, such as an intersection. In response to receiving the signal, the WCD initiates a Random-Access Channel (RACH) procedure, which triggers initiation of a collision-avoidance procedure. In some examples, the collision-avoidance procedure includes a base station transmitting a safety message that indicates the presence of the mobile WCD. In other examples, the collision-avoidance procedure includes the mobile WCD transmitting a device-to-device (D2D) safety message using D2D resources. In further examples, the collision-avoidance procedure includes the mobile WCD sensing D2D resources in order to detect D2D transmissions from a D2D-capable device.

18 Claims, 7 Drawing Sheets

(51) Int. Cl.
*H04W 52/02* (2009.01)
*H04W 72/20* (2023.01)
*H04W 74/0833* (2024.01)
*H04W 76/14* (2018.01)

(52) U.S. Cl.
CPC ......... *H04W 74/085* (2013.01); *H04W 76/14* (2018.02); *G08G 1/166* (2013.01)

(56) References Cited

U.S. PATENT DOCUMENTS

| | | | |
|---|---|---|---|
| 10,129,842 B2 * | 11/2018 | Jeong | H04W 72/21 |
| 10,764,897 B2 * | 9/2020 | Feng | H04W 72/51 |
| 10,980,068 B2 * | 4/2021 | Lim | H04W 74/0833 |
| 2013/0059583 A1 * | 3/2013 | Van Phan | H04W 72/04 |
| | | | 455/435.1 |
| 2014/0128089 A1 * | 5/2014 | Jang | H04W 72/541 |
| | | | 455/452.2 |
| 2016/0128006 A1 * | 5/2016 | Ji | H04W 72/04 |
| | | | 370/350 |
| 2018/0184442 A1 | 6/2018 | Bai et al. | |
| 2018/0227943 A1 * | 8/2018 | Xiao | H04W 76/14 |
| 2018/0376525 A1 * | 12/2018 | Feng | H04W 76/11 |
| 2019/0342874 A1 * | 11/2019 | Davydov | H04W 72/23 |
| 2019/0394713 A1 * | 12/2019 | Zheng | H04W 56/0015 |
| 2020/0092685 A1 * | 3/2020 | Fehrenbach | H04W 84/005 |
| 2022/0248301 A1 * | 8/2022 | Ji | H04W 40/248 |
| 2023/0031495 A1 * | 2/2023 | Chang | H04W 52/0216 |

* cited by examiner

LOCAL BROADCAST TO TRIGGER RACH PROCEDURE AS PART OF INITIATION OF COLLISION-AVOIDANCE PROCEDURE

CLAIM OF PRIORITY

The present application claims the benefit of priority to Provisional Application No. 62/961,831, entitled "Local Broadcast for Vulnerable Road User Safety", docket number TPRO 00346 US, and to Provisional Application No. 62/961,825, entitled "Local Broadcast for Vulnerable Road User Safety", docket number TPRO 00345 US, both filed Jan. 16, 2020, assigned to the assignee hereof, and hereby expressly incorporated by reference in their entirety.

FIELD

This invention generally relates to wireless communications and more particularly to local broadcasts of a signal containing an indicator.

BACKGROUND

There is a benefit when information is provided to vulnerable road users (e.g., pedestrians or cyclists) regarding the presence of moving vehicles. More specifically, providing warnings to vulnerable road users may advantageously prevent collisions with moving vehicles.

SUMMARY

The methods, devices, and systems discussed herein involve a mobile wireless communication device (WCD) receiving a signal containing an indicator upon entering a first area that is near a potential safety scenario, such as an intersection. In response to receiving the signal, the WCD initiates a Random-Access Channel (RACH) procedure, which triggers initiation of a collision-avoidance procedure. In some examples, the collision-avoidance procedure includes a base station transmitting a safety message that indicates the presence of the mobile WCD. In other examples, the collision-avoidance procedure includes the mobile WCD transmitting a device-to-device (D2D) safety message using D2D resources. In further examples, the collision-avoidance procedure includes the mobile WCD sensing D2D resources in order to detect D2D transmissions from a D2D-capable device.

DETAILED DESCRIPTION

Figure 1A:
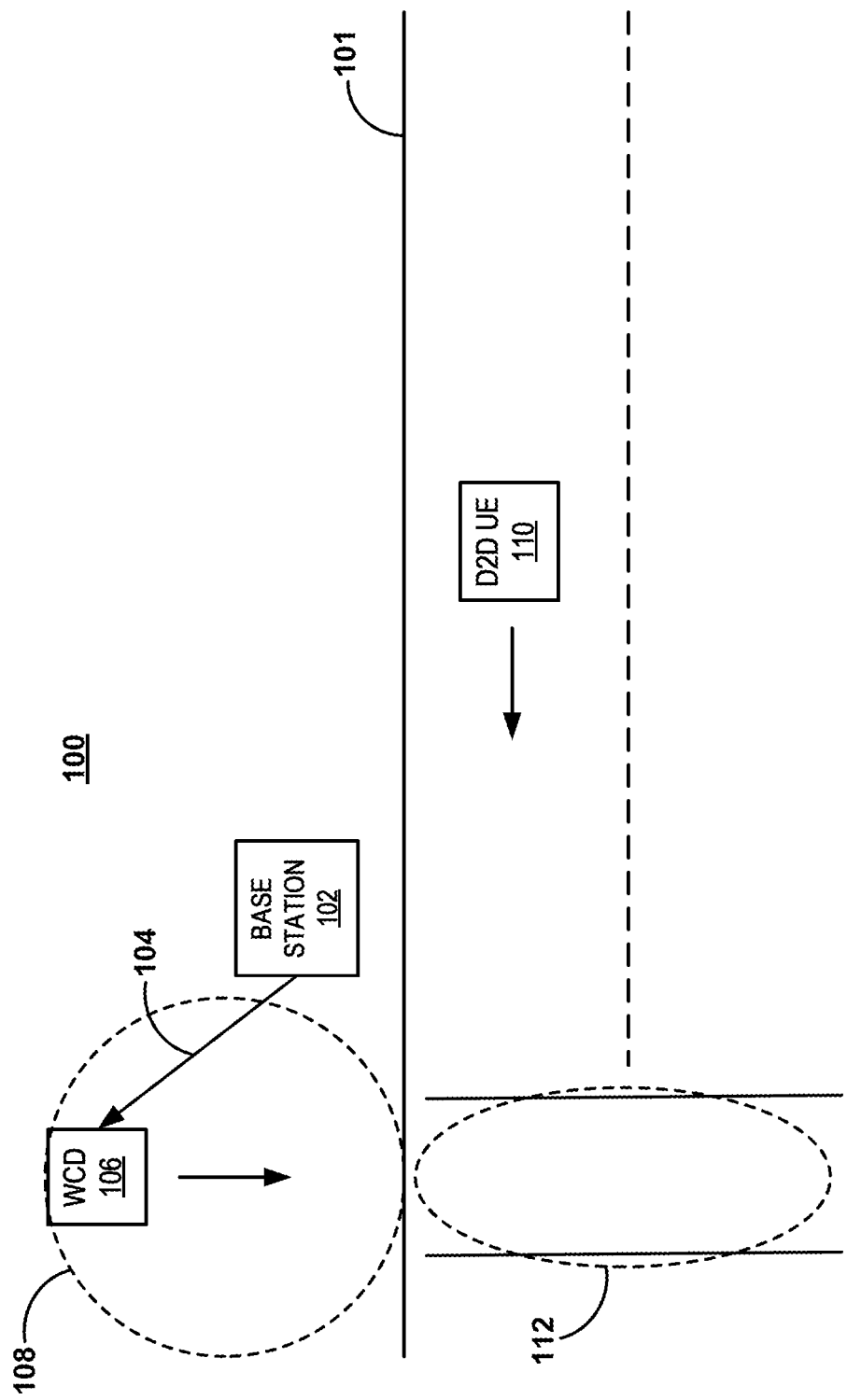
FIG. 1A is a block diagram of an example of a system in which a mobile wireless communication device receives, upon entering a first area, a signal containing an indicator and, in response, initiates a Random-Access Channel (RACH) procedure, which triggers initiation of a collision-avoidance procedure.

The examples described herein are generally directed to providing warnings to vulnerable road users (e.g., pedestrians or cyclists) regarding the presence of moving objects (e.g., vehicles, drones, robots, etc.). These warnings may advantageously prevent collisions between the vulnerable road users and the moving objects.

For example, consider the scenario in which a pedestrian is about to cross a street by using a crosswalk at an intersection and an approaching vehicle is about to pass through the same crosswalk. In this situation, a vehicle user equipment device (VUE) located within the vehicle transmits a warning message using device-to-device (D2D) communication resources. The pedestrian user equipment device (PUE) receives the warning message, if the PUE is monitoring all available D2D communication resources. Although effective, this method is inefficient, from a battery-consumption point of view, since the PUE must constantly remain powered on and active to monitor all of the available D2D communication resources.

In order to save battery power, the PUE can be configured to (1) perform periodic monitoring of selected D2D communication resources (e.g., partial sensing method), and (2) go to sleep in between the sensing durations (e.g., periods). The VUEs are configured to transmit their warning messages using only the selected D2D communication resources that are being periodically monitored by the PUE. Although the PUE monitors a smaller subset of D2D communication resources, this method still does not significantly reduce the power consumption required by the PUE to monitor the D2D communication resources. More specifically, the PUE must periodically wake-up from its sleep state, resynchronize, and then detect the VUE's warning messages. Besides the inefficient battery consumption, this method is also not suitable in situations when latency is critical. For example, the periodicity of the selected D2D communication resources could be too long for many collision-avoidance scenarios.

As an alternative to the VUEs transmitting warning messages, the PUEs could broadcast warning messages using the first available D2D communication resource. Since the VUEs have no battery consumption constraint, they can continuously monitor all of the D2D communication resources. For example, a PUE would transmit a warning message when it gets close to a potentially hazardous situation (e.g., before reaching a street crossing). This warning message would provide safety-related information such as the PUE's location and heading. Once the PUE is no longer in or near a potentially hazardous situation (e.g., the pedestrian is done crossing the street), the PUE stops transmitting the warning message. However, this method would require the PUE to be constantly aware of its geo-location, which would require the PUE's power-consuming, global positioning system (GPS) receiver or other geo-location determination hardware to stay active.

Instead of the PUE determining its geo-location, an improvement to the above method is for the network to send a warning message to the PUE using the cellular link (Uu-link), which would trigger the PUE to transmit a location/heading safety message over D2D communication resources. For example, if a road sensor (e.g., camera, radar, etc.) detects a pedestrian, the road sensor notifies the cellular network. After receiving the notification, a gNB (e.g., base station) of the cellular network broadcasts a paging or notification message to an area in which the PUE is located. In other examples, the gNB transmits the paging or notification message to one or more PUEs via a unicast or multicast transmission. Regardless of how the paging or notification message is transmitted, the paging or notification message contains an indicator, which instructs the PUE to activate a collision-avoidance procedure. In some examples, the collision-avoidance procedure includes transmitting a D2D location/heading safety message.

The near-by VUEs receive this safety message and take the appropriate steps to avoid collision. Although this method reduces the PUE's battery-consumption, the method has a large delay due to the road sensor detection processing, road sensor accessing the network, network processing, and the network paging the PUE. Moreover, the network must wait to page the PUE when the PUE wakes up from its sleep cycle. In some examples, all of these added delays are unacceptable, especially for safety-related applications. Therefore, there is a need to reduce this delay.

Some of the examples described herein are configured to operate in conjunction with the IDLE state procedure of the 3rd Generation Partnership Project 5G New Radio (3GPP 5G NR) communication specification. As part of the 3GPP 5G NR IDLE state procedure, a user equipment device (UE) sleeps for a time-period to reduce battery consumption and periodically wakes up to receive a paging message. If the UE does not receive a paging message, the UE goes back to sleep until the next wake up time. This sleep cycle is also known as discontinuous reception (DRX).

The basic mechanism for DRX is a configurable DRX cycle in the UE. A DRX cycle configuration consists of many parameters, such a DRX period, on-duration, DRX inactivity timer, DRX retransmission timer, etc. With a DRX cycle configured, the UE monitors the downlink control signaling only when active, sleeping with the receiver circuitry switched off (e.g., in an IDLE state) when not active. This allows for a significant reduction in power consumption: the longer the cycle, the lower the power consumption.

Naturally, this implies restrictions to the scheduler as the UE can be addressed only when active, according to the DRX cycle. Thus, a (long) DRX cycle in combination with the UE remaining awake for some period after being scheduled is sufficient for most scenarios. However, some services, most notably Voice over Internet Protocol (VoIP), are characterized by periods of regular transmission, followed by periods of no or very little activity.

To handle these services, a short DRX cycle can optionally be used in addition to the long cycle described above. Normally, the UE follows the long DRX cycle, but if it has recently been scheduled, the UE will follow a shorter DRX cycle for some time. Handling VoIP in this scenario can be done by setting the short DRX cycle to 20 ms, as the voice codec typically delivers a VoIP packet once every 20 ms. The long DRX cycle is then used to handle longer periods of silence when the UE is not receiving VoIP packets.

Upon waking from an IDLE state (e.g., sleep state), the UE attempts to detect the last serving cell's Synchronization Signal Block (SSB) to receive the paging message. In the context of 3GPP 5G NR, the SSB is comprised of a primary synchronization signal (PSS), a secondary synchronization signal (SSS), and a downlink physical broadcast channel (PBCH). The PSS and SSS are a pair of downlink signals that are used by UEs to find, identify, and synchronize to a network. The PBCH is transmitted together with the PSS/SSS and carries a minimum amount of system information including an indication where the remaining broadcast system information is transmitted. The PSS, SSS, and PBCH are jointly referred to as the SSB.

Besides attempting to detect the last serving cell's SSB upon waking, the UE may also attempt to detect one or more neighboring cell's SSBs, as well. If successfully detected, the UE adds the detected SSBs of the neighboring cells to a list of candidate cells. The UE maintains the list of candidate cells in order to perform a handover to another cell when the downlink signal of one of the candidate cells has a stronger received signal strength than the downlink signal of the serving cell. Since the UE may have performed a reselection to another cell, the network is not aware of the exact cell the UE is camping on during its IDLE state. Thus, when the network needs to page a UE, the network will send the page to a group of cells in case the UE has performed a handover to a neighboring cell during the IDLE state of the UE.

The methods, devices, and systems discussed herein involve a mobile wireless communication device (WCD), such as a PUE, receiving a signal containing an indicator upon entering a first area that is near a potential safety scenario, such as an intersection. In response to receiving the signal, the PUE initiates a Random-Access Channel (RACH) procedure, which triggers initiation of a collision-avoidance procedure. In accordance with known techniques, the RACH procedure includes four messages where the first message includes transmission of a Physical RACH (PRACH) that includes a preamble. In some examples, the collision-avoidance procedure includes a base station transmitting a safety message that indicates the presence of the mobile WCD. In other examples, the collision-avoidance procedure includes the mobile WCD transmitting a device-to-device (D2D) safety message using D2D resources. In further examples, the collision-avoidance procedure includes the mobile WCD sensing D2D resources in order to detect D2D transmissions from a D2D-capable device.

Although the different examples described herein may be discussed separately, any of the features of any of the examples may be added to, omitted from, or combined with any other example. Similarly, any of the features of any of the examples may be performed in parallel or performed in a different manner/order than that described or shown herein.

FIG. 1A is a block diagram of an example of system 100 in which a mobile wireless communication device receives, upon entering a first area, a signal containing an indicator and, in response, initiates a Random-Access Channel (RACH) procedure, which triggers initiation of a collision-avoidance procedure.

For the example of FIG. 1A, base station 102 is located near roadway 101. Base station 102, also referred to as a gNB, operates in accordance with at least one revision of the 3rd Generation Partnership Project 5G New Radio (3GPP 5G NR) communication specification. In other examples, base station 102 may operate in accordance with other communication specifications. In still further examples, a local remote radio head (RRH), a UE-type or gNB-type road side unit (RSU), a D2D-capable device, or any other suitable wireless communication device (WCD) can be used in place of base station 102 to perform the functions described herein.

In the interest of brevity, FIG. 1A only depicts one base station and one WCD. However, any number of base stations may be utilized to accommodate the safety requirements of a particular area. Likewise, any number of WCDs may be serviced by the base stations.

Figure 2A:
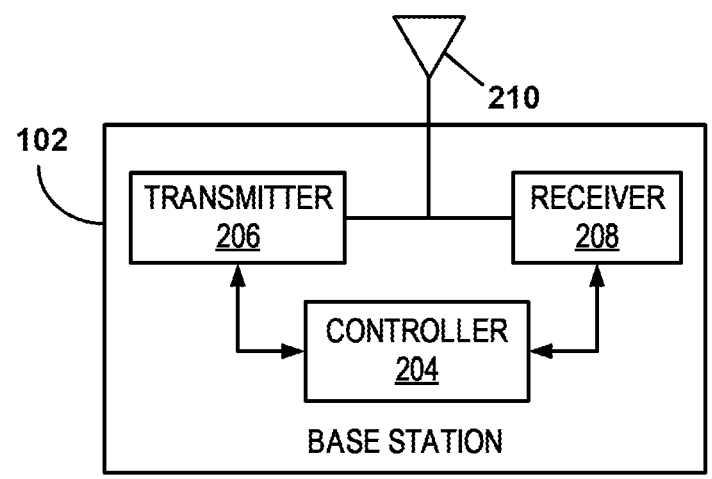
FIG. 2A is a block diagram of an example of the base station shown in FIG. 1A.

As shown in FIG. 2A, base station 102 comprises controller 204, transmitter 206, and receiver 208, as well as other electronics, hardware, and software code. Base station 102 is any fixed, mobile, or portable equipment that performs the functions described herein. The various functions and operations of the blocks described with reference to base station 102 may be implemented in any number of devices, circuits, or elements. Two or more of the functional blocks may be integrated in a single device, and the functions described as performed in any single device may be implemented over several devices.

For the example shown in FIG. 2A, base station 102 may be a fixed device or apparatus that is installed at a particular location at the time of system deployment. Examples of such equipment include fixed base stations or fixed transceiver stations. In some situations, base station 102 may be mobile equipment that is temporarily installed at a particular location. Some examples of such equipment include mobile transceiver stations that may include power generating equipment such as electric generators, solar panels, and/or batteries. Base station 102 may also include detection equipment such as a camera, radar, lidar, and/or an infra-red heat sensor. Larger and heavier versions of such equipment may be transported by trailer. In still other situations, base station 102 may be a portable device that is not fixed to any particular location. Accordingly, base station 102 may be a portable user device such as a UE device in some circumstances.

Controller 204 includes any combination of hardware, software, and/or firmware for executing the functions described herein as well as facilitating the overall functionality of base station 102. An example of a suitable controller 204 includes software code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals to be transmitted as part of a downlink signal and can apply any one of a plurality of modulation orders. The demodulator demodulates any uplink signals received at base station 102 in accordance with one of a plurality of modulation orders.

Figure 2B:
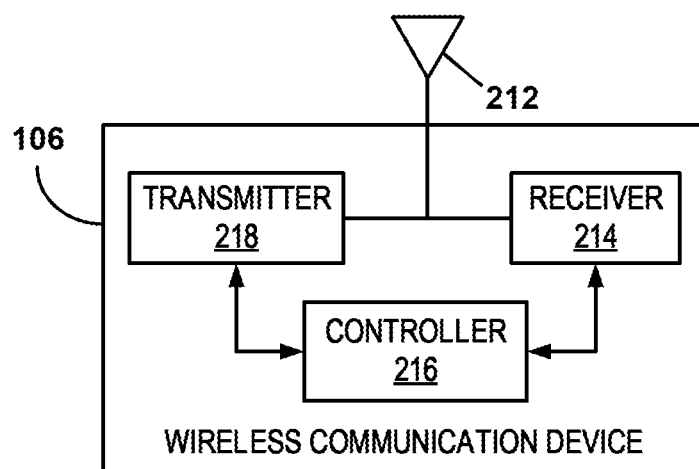
FIG. 2B is a block diagram of an example of the mobile wireless communication device shown in FIG. 1A.

As shown in FIG. 2B, mobile wireless communication device (WCD) 106 comprises controller 216, transmitter 218, and receiver 214, as well as other electronics, hardware, and software code. WCD 106 may also be referred to herein as a PUE or simply as a user equipment device (UE). WCD 106 is wirelessly connected to a radio access network (not shown) via one or more base stations (not shown), which provide various wireless services to WCD 106. For the example shown in FIG. 1A, WCD 106 operates in accordance with at least one revision of the 3rd Generation Partnership Project 5G New Radio (3GPP 5G NR) communication specification. In other examples, WCD 106 may operate in accordance with other communication specifications.

WCD 106 is any fixed, mobile, or portable equipment that performs the functions described herein. The various functions and operations of the blocks described with reference to WCD 106 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a user equipment device. An example of a suitable controller 216 includes software code running on a microprocessor or processor arrangement connected to memory. Transmitter 218 includes electronics configured to transmit wireless signals. In some situations, the transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the user equipment device functions. The required components may depend on the particular functionality required by the user equipment device.

Transmitter 218 includes a modulator (not shown), and receiver 214 includes a demodulator (not shown). The modulator can apply any one of a plurality of modulation orders to modulate the signals to be transmitted by transmitter 218. The demodulator demodulates received signals, in accordance with one of a plurality of modulation orders.

For the example shown in FIG. 1A, WCD 106 receives, upon entering first area 108, signal 104 from base station 102. Signal 104 contains an indicator. In some examples, the indicator indicates that WCD 106 is near a potential safety scenario. In other examples, the indicator indicates that WCD 106 should activate a collision-avoidance procedure. In further examples, the indicator indicates that WCD 106 should initiate a RACH procedure.

In some examples, base station 102 can change the periodicity of broadcast transmissions, based on the DRX cycle configuration of a group of WCDs. For example, if one group of WCDs wake at time t1 and another group of WCDs wake up at time t2, base station 102 can selectively broadcast signals 104 that correspond with time t1 for the first group of WCDs, with time t2 for the second group of WCDs, or both. In other examples, signal 104 is scheduled for broadcast transmission based on the DRX cycle configuration of a particular WCD 106 since base station 102 is aware of when WCD 106 will wake from the IDLE state.

In the example shown in FIG. 1A, base station 102 transmits, via cellular communication resources, signal 104 within first area 108. In some examples, signal 104 is part of a Synchronization Signal Block (SSB) comprising one or more broadcast signals. In other examples, signal 104 is a System Information Block (SIB) message.

In the examples in which signal 104 is part of an SSB, the indicator may be contained within a synchronization signal of the SSB. For example, a specific sequence with a specific offset for the primary synchronization signal (PSS) and/or the secondary synchronization signal (SSS) of the SSB could be transmitted as the indicator, in some examples. In other examples, the indicator may be contained within a physical broadcast channel (PBCH) transmission of the SSB. In these examples, the indicator could be transmitted within a specific field carried in the master information block (MIB) of the PBCH.

In examples in which signal 104 is a SIB message, the indicator may be contained in a System Information Block Type 1 (SIB1) message. The SIB1 message carries the remaining minimum system information that was not transmitted in the PBCH. In some examples, the SIB1 message is periodically broadcasted with a periodicity of 160 ms. However, a periodicity of 160 ms may cause excessive latency for some safety messaging applications. Thus, the periodicity of the SIB1 messaging may be reduced below 160 ms, in some examples.

In other examples in which signal 104 is a SIB message, the indicator may be contained in a SIB message other than a SIB1 message. In some examples, a SIB1 message directs WCD 106 to a subsequent SIB message that contains the indicator. In further examples, the SIB message containing the indicator is either broadcasted periodically or when requested by WCD 106.

In some examples, signal 104 is transmitted within a beam directed to first area 108. One example of such a localized transmission would be a 5G NR beam-centric transmission to first area 108. In other examples, other beamforming techniques may be used to localize transmission of signal 104 within first area 108. In further examples, signal 104 may be transmitted as a localized broadcast to first area 108.

In other examples in which a device other than base station 102 is transmitting signal 104, signal 104 may transmitted by any other suitable wireless communication protocol. Examples of other suitable wireless communication protocols include, but are not limited to, D2D communication resources, Institute of Electrical and Electronics Engineers (IEEE) 802.11 (Wi-Fi), etc. In other examples, signal 104 may be transmitted from one or more of the following: a base station, a local remote radio head (RRH), a UE-type or gNB-type road side unit (RSU), a D2D-capable device, or any other suitable wireless communication device.

As used herein, first area 108 is an area that is at least near a potential safety scenario (e.g., an intersection, a crosswalk, or any other location in which a vulnerable road user may experience a collision with a moving object that is using a roadway). Second area 112 is an area that at least partially overlaps with the potential safety scenario, itself. First area 108 and second area 112 may have any suitable size, shape, and location. Moreover, in some examples, first area 108 may overlap, at least partially, with the potential safety scenario and/or second area 112. As shown in the example of FIG. 1A, first area 108 is an area near a potential safety scenario (e.g., a crosswalk), and second area 112 is an area that overlaps with the potential safety scenario, itself. For the example shown in FIG. 1A, WCD 106 enters first area 108 and is moving towards second area 112, which is a potential safety scenario.

Upon entering first area 108, WCD 106 receives signal 104, which contains an indicator, from base station 102. In response to receiving signal 104, WCD 106 initiates a connection establishment procedure, such as a RACH procedure, with base station 102. For example, as part of the RACH procedure, WCD 106 transmits, via transmitter 218 and antenna 212, messages and receives messages via receiver 214 and antenna 212. The UE first transmits the PRACH consisting of the preamble. In response to the PRACH, the gNB transmits the RA Response (RAR) providing the time-alignment command. The WCD receives the RAR and applies the timing adjustment provided in the RAR, to transmit a Radio Resource Control (RRC) Connection Request Message (Msg 3). In some examples, the RRC Connection Request Message includes a cause value (e.g., monitor safety message or D2D transmissions) that indicates to the network the cause of the establishment request. In other examples, WCD 106 may transmit the cause value as part of other messages. For example, a preamble partition can be established in some situations such that only UE devices wanting to monitor/transmit safety messages would select one of the preambles from this partition. The incorporation of the partition depends on the particular implementation. Note, in these examples, WCD 106 does not enter the connected mode since the RACH procedure would not be completed.

In response to receiving the RACH procedure message (e.g., either the RRC Connection Request Message or the RACH Preamble Message), base station 102 transmits, via transmitter 206 and antenna 210, a safety message that indicates the presence of WCD 106 to D2D-capable device 110 (e.g., a nearby VUE). In some examples, the safety message includes location and heading information of WCD 106. In further examples, base station 102 transmits the safety message before WCD 106 reaches second area 112. Base station 102 may also transmit an RRC Connection Setup Message (Msg 4) to WCD 106 to acknowledge receipt of the RACH procedure message, after which WCD 106 returns to an IDLE state.

In response to the safety message, D2D-capable device 110 can do one or more of the following: begin transmitting D2D transmissions 114, as described below in connection with FIG. 1B; alert a user associated with D2D-capable device 110 that there is a potential for a collision with a vulnerable road user; and take action to prevent the collision (e.g., by braking, changing lanes, turning, etc., with or without user intervention).

In still further examples, base station 102 may transmit, to a neighboring base station or WCD (not shown), a request that the neighboring base station/WCD also transmits (e.g., broadcasts) the safety message that indicates the presence of WCD 106 to any VUEs near second area 112. In examples in which base station 102 is operating in accordance with the 3GPP Long-Term Evolution (LTE) communication specification, the request is transmitted over an X2 interface, which may be wired or wireless. In examples in which base station 102 is operating in accordance with the 3GPP 5G NR communication specification, the request is transmitted over an Xn interface, which may be wired or wireless.

Figure 1B:
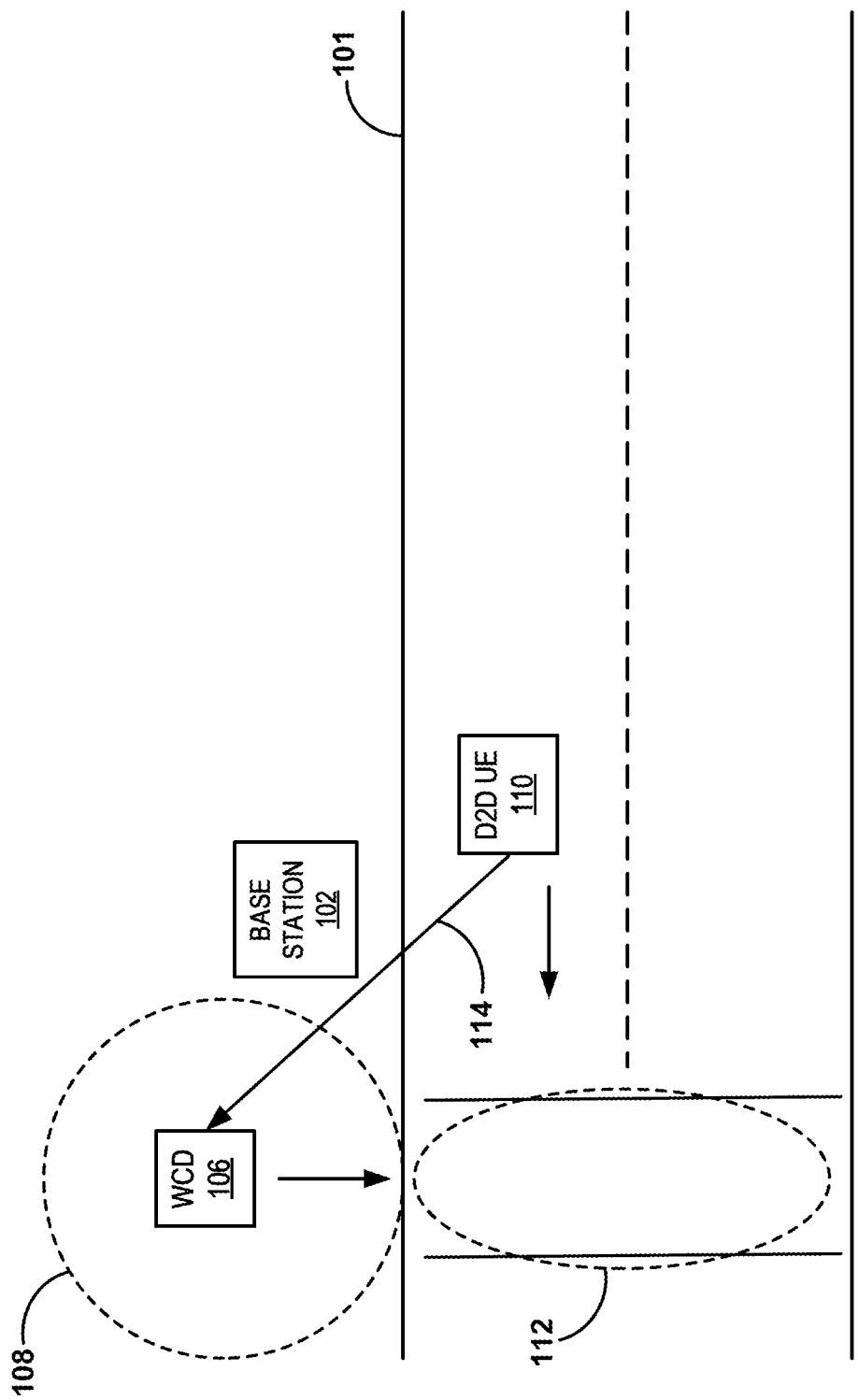
FIG. 1B is a block diagram of an example of a system in which a collision-avoidance procedure triggered in FIG. 1A includes the mobile wireless communication device sensing device-to-device (D2D) resources in order to detect D2D transmissions from a D2D-capable device.

In other examples, such as that shown in FIG. 1B, controller 216 of WCD 106 is further configured to activate, in response to receiving an instruction from base station 102 to sense device-to-device (D2D) resources in order to detect D2D transmissions from a D2D-capable device, a collision-avoidance procedure that includes sensing the D2D resources in order to detect D2D transmissions 114 from D2D-capable device 110. In further examples, such as that shown in FIG. 1C, controller 216 of WCD 106 is configured to activate, in response to receiving an instruction from base station 102 to transmit a D2D safety message using D2D resources, a collision-avoidance procedure that includes transmitting D2D safety message 116 using D2D resources. Either collision-avoidance procedure will help avoid a collision between WCD 106 and D2D-capable device 110, which is approaching WCD 106.

In some examples, the time duration between when WCD 106 enters first area 108 to the time when WCD 106 activates the collision-avoidance procedure depends, at least partially, upon the periodicity of the D2D transmissions 114 from D2D-capable device 110. Thus, first area 108 should cover an area that is large enough to ensure that WCD 106 will wake up to receive signal 104 and either receive D2D transmissions 114 from or transmit D2D safety message 116 to D2D-capable device 110 before reaching second area 112.

As used herein, a D2D-capable device is any device that is capable of D2D communication. In some examples, D2D-capable device 110 is integrated into a vehicle, drone, robot, or the like as an onboard unit (OBU). In other examples, D2D-capable device 110 may simply be a user equipment (UE) device that is located within a vehicle, drone, robot, or the like. In further examples, D2D-capable device 110 may just be a UE device. Some examples of user equipment devices include: a mobile phone, a transceiver modem, a personal digital assistant (PDA), or a tablet, for example. Any of the foregoing devices may also be referenced herein as vehicle UEs (VUEs).

In further examples, controller 216 of WCD 106 is further configured to prevent WCD 106 from entering an IDLE state until the D2D transmissions from D2D-capable device 110 are detected. One way in which this can be achieved is for WCD 106 to indicate to base station 102, upon receipt of signal 104, that WCD 106 is functioning as a PUE, which would prevent base station 102 from sending WCD 106 to the IDLE state. Once WCD 106 exits first area 108 and/or second area 112, WCD 106 can send an RRC message to base station 102 indicating that WCD 106 has left first area 108 and/or second area 112, which would trigger base station 102 to release WCD 106 to the IDLE state. Other techniques may be used to manage transitions from IDLE and connected modes. Therefore, in some situations the PUE returns to the IDLE state and still operates in D2D mode. In other situations, the PUE remains in CONN state and communicates with the gNB while operating in D2D mode as well (NR V2X Mode-1).

Different techniques may also be used to provide information to the gNB that the PUE is leaving the area. For example, in some situations, the PUE informs the gNB that it is out of range of the D2D transmissions and the gNB releases the PUE. The PUE may determine the out-of-range situation based on signal level, SNR or other factors or combination of factors. In other situations, the PUE monitors its geographical location and informs the gNB that it has exited the area based on the PUE location relative to the location and range of the area.

FIG. 1B is a block diagram of an example of a system in which a collision-avoidance procedure triggered in FIG. 1A includes the mobile wireless communication device sensing device-to-device (D2D) resources in order to detect D2D transmissions from a D2D-capable device. For example, upon entering first area 108, WCD 106 receives, via antenna 212 and receiver 214, signal 104 from base station 102. As mentioned above, signal 104 contains an indicator.

In response to receiving signal 104, WCD 106 initiates a connection establishment procedure, such as a RACH procedure, with base station 102, as described above in connection with FIG. 1A. In response to receiving a RACH procedure message (e.g., either the RRC Connection Request Message or the RACH Preamble Message), base station 102 transmits, via transmitter 206 and antenna 210, an instruction to sense device-to-device (D2D) resources in order to detect D2D transmissions from a D2D-capable device.

In response to the instruction, WCD 106 utilizes controller 216 to activate a collision-avoidance procedure that includes sensing device-to-device (D2D) resources, using antenna 212 and receiver 214, in order to detect D2D transmissions 114 from D2D-capable device 110. As used herein, the term "sensing" includes energy-detection and/or successful decoding of the received signal's control channel. In some examples, the D2D resources that are sensed/monitored include a D2D resource pool configured for communication between D2D-capable devices and mobile WCDs.

In further examples, controller 216 of WCD 106 is also configured to place mobile WCD 106 into a sleep state after sensing the D2D resources. In still further examples, controller 216 of WCD 106 is configured to refrain from placing mobile WCD 106 into a sleep state until after there is no longer a potential for a collision (e.g., the approaching D2D-capable device 110 and/or WCD 106 have moved past the potential safety scenario, the approaching D2D-capable device 110 and/or WCD 106 have changed directions, etc.).

In some examples, the received D2D transmissions 114 include safety message information that WCD 106 can utilize to avoid a collision with a vehicle in which D2D-capable device 110 is located. Examples of safety message information include: location and heading of D2D-capable device 110, estimated time before D2D-capable device 110 enters a potential safety scenario, etc. Upon receipt of D2D transmissions 114, WCD 106 alerts a user associated with WCD 106 that there is a potential for a collision with an approaching object on roadway 101. In some examples, an application running on WCD 106 could generate an audible and/or tactile alert when WCD 106 receives a safety message from D2D-capable device 110.

Figure 1C:
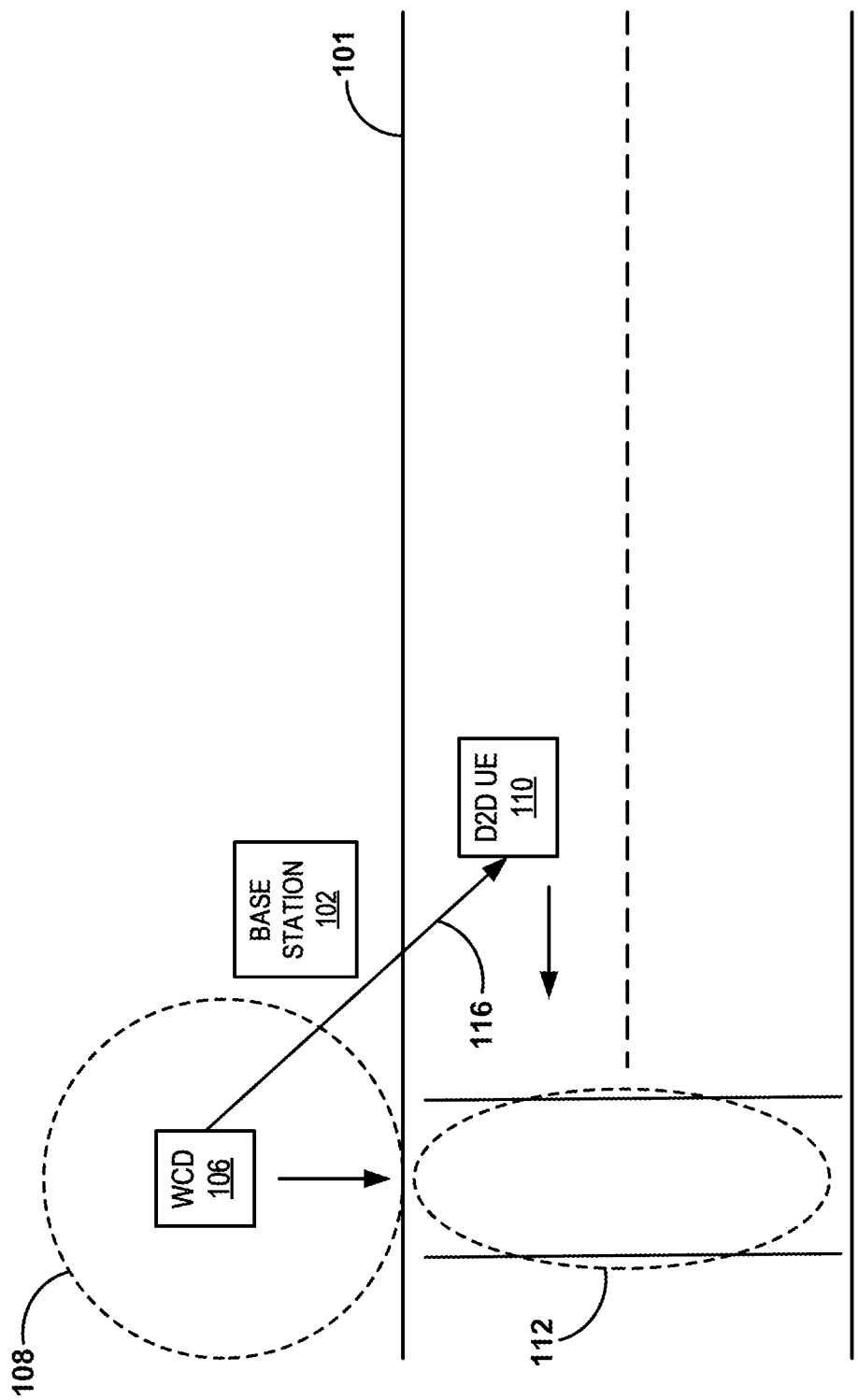
FIG. 1C is a block diagram of an example of a system in which the collision-avoidance procedure triggered in FIG. 1A includes transmitting, from the mobile wireless communication device, a D2D safety message using D2D resources.

FIG. 1C is a block diagram of an example of a system in which the collision-avoidance procedure triggered in FIG. 1A includes transmitting, from the mobile wireless communication device, a periodic device-to-device (D2D) safety message using D2D resources. For example, upon entering first area 108 and waking from an IDLE state, WCD 106 receives, via antenna 212 and receiver 214, signal 104 from base station 102. As mentioned above, signal 104 contains an indicator.

In response to receiving signal 104, WCD 106 initiates a connection establishment procedure, such as a RACH procedure, with base station 102, as described above in connection with FIG. 1A. In response to receiving a RACH procedure message (e.g., either the RRC Connection Request Message or the RACH Preamble Message), base station 102 transmits, via transmitter 206 and antenna 210, an instruction to transmit a device-to-device (D2D) safety message.

In some examples, the instruction to transmit the D2D safety message is received during the RACH procedure. More specifically, the instruction to transmit the D2D safety message may be received in a Radio Resource Control (RRC) Connection Setup Message (Msg 4), after which WCD 106 returns to an IDLE state, in some examples. The instruction may also be sent in the RAR in some situations. In other examples, the instruction to transmit the D2D safety message is a scheduling instruction received while WCD 106 is in a CONNECTED state.

In response to the instruction, WCD 106 utilizes controller 216 to activate a collision-avoidance procedure that includes transmitting, via transmitter 218 and antenna 212, device-to-device (D2D) safety message 116 using D2D resources. In some examples, WCD 106 periodically transmits D2D safety message 116. In some examples, D2D safety message 116 includes location and heading information of the WCD 106.

In some examples, WCD 106 transmits D2D safety message 116 using D2D resource pools (Mode 2 resource) provided via SIB messaging from the network. In other examples, WCD 106 becomes aware of sidelink resource pool locations and broadcasts D2D safety message 116 on the appropriate D2D communication resources. More specifically, in the examples in which the instruction to transmit the D2D safety message is a scheduling instruction received while WCD 106 is in a CONNECTED state, D2D safety message 116 may be transmitted using a Mode 1 sidelink resource allocation.

In other examples, D2D safety message 116 may also include an estimated time when WCD 106 will enter a potential safety scenario. In further examples, transmitter 218 is configured to transmit D2D safety message 116 before WCD 106 reaches second area 112. Upon receipt of D2D safety message 116, D2D-capable device 110 can do one or more of the following: alert a user associated with D2D-capable device 110 that there is a potential for a collision with a vulnerable road user, and take action to prevent the collision (e.g., by braking, changing lanes, turning, etc., with or without user intervention).

Figure 3:
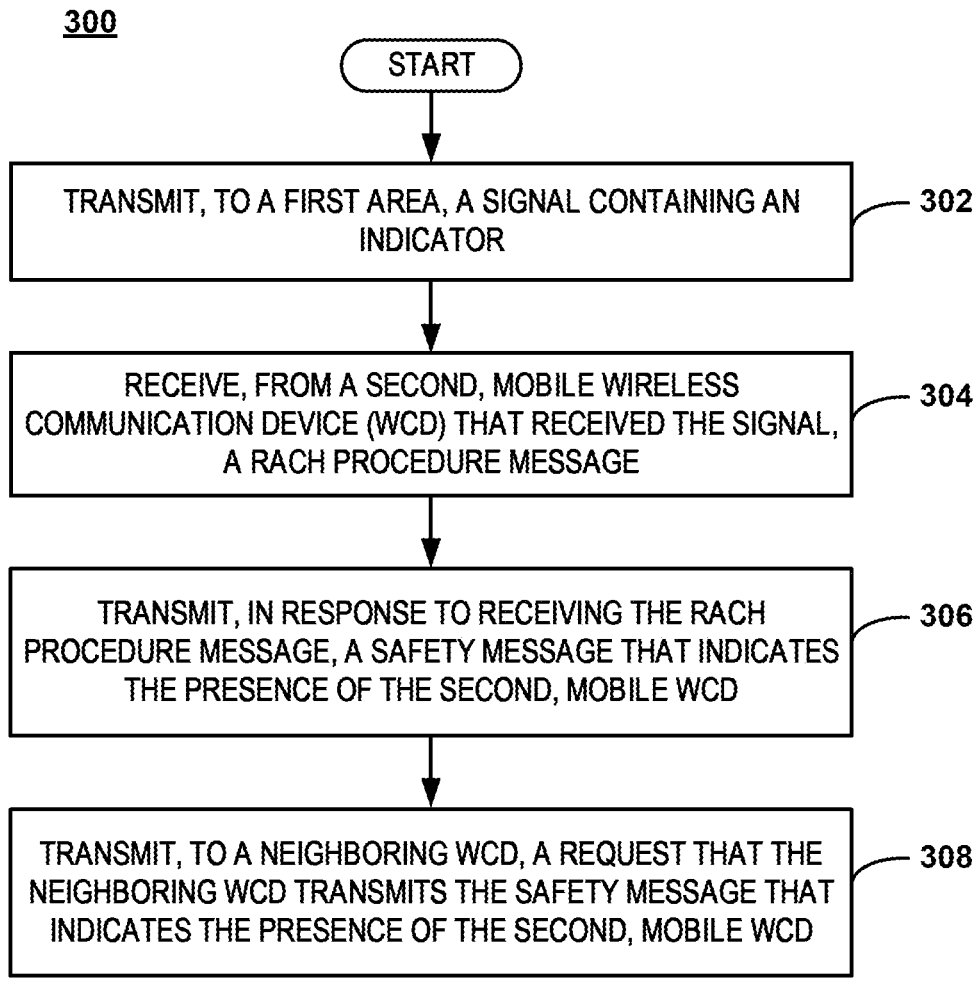
FIG. 3 is a flowchart of an example of a method of transmitting, to a first area, a signal containing an indicator, receiving a RACH procedure message, and transmitting a safety message that indicates the presence of the mobile wireless communication device.

FIG. 3 is a flowchart of an example of a method of transmitting, to a first area, a signal containing an indicator, receiving a RACH procedure message, and transmitting a safety message that indicates the presence of the mobile wireless communication device. The method 300 begins at step 302 with first wireless communication device (WCD) 102 transmitting, to first area 108, a signal 104 containing an indicator. At step 304, first WCD 102 receives, from second, mobile WCD 106 that received signal 104, a RACH procedure message. At step 306, first WCD 102 transmits, in response to receiving the RACH procedure message, a safety message that indicates the presence of second, mobile WCD 106. At step 308, first WCD 102 transmits, to a neighboring WCD, a request that the neighboring WCD transmits the safety message that indicates the presence of second, mobile WCD 106. In other examples, one or more of the steps of method 300 may be omitted, combined, performed in parallel, or performed in a different order than that described herein or shown in FIG. 3. In still further examples, additional steps may be added to method 300 that are not explicitly described in connection with the example shown in FIG. 3.

Figure 4:
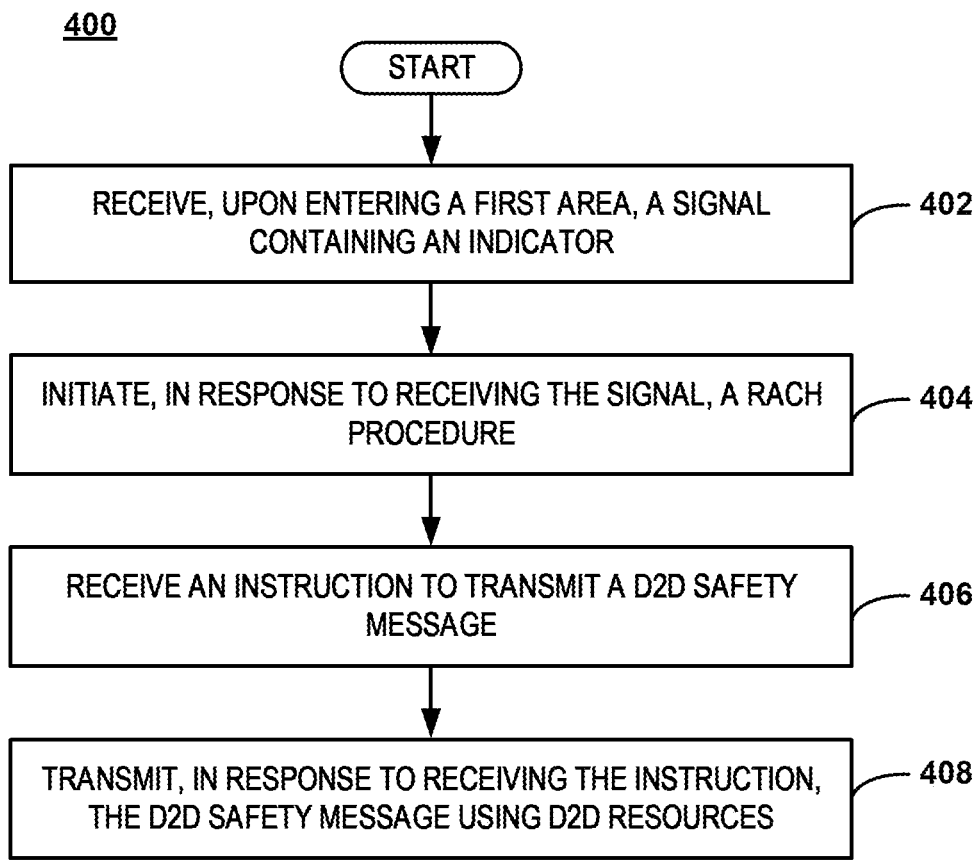
FIG. 4 is a flowchart of an example of a method of receiving a signal containing an indicator and, in response, initiating a RACH procedure, receiving an instruction to transmit a device-to-device (D2D) safety message, and transmitting, in response to receiving the instruction, the D2D safety message using D2D resources.

FIG. 4 is a flowchart of an example of a method of receiving a signal containing an indicator and, in response, initiating a RACH procedure, receiving an instruction to transmit a device-to-device (D2D) safety message, and transmitting, in response to receiving the instruction, the D2D safety message using D2D resources. The method 400 begins at step 402 with wireless communication device (WCD) 106 receiving, upon entering first area 108, a signal 104 containing an indicator. At step 404, WCD 106 initiates, in response to receiving signal 104, a RACH procedure. At step 406, WCD 106 receives an instruction to transmit a D2D safety message. At step 408, WCD 106 transmits, in response to receiving the instruction, D2D safety message 116 using D2D resources. In other examples, one or more of the steps of method 400 may be omitted, combined, performed in parallel, or performed in a different order than that described herein or shown in FIG. 4. In still further examples, additional steps may be added to method 400 that are not explicitly described in connection with the example shown in FIG. 4.

Figure 5:
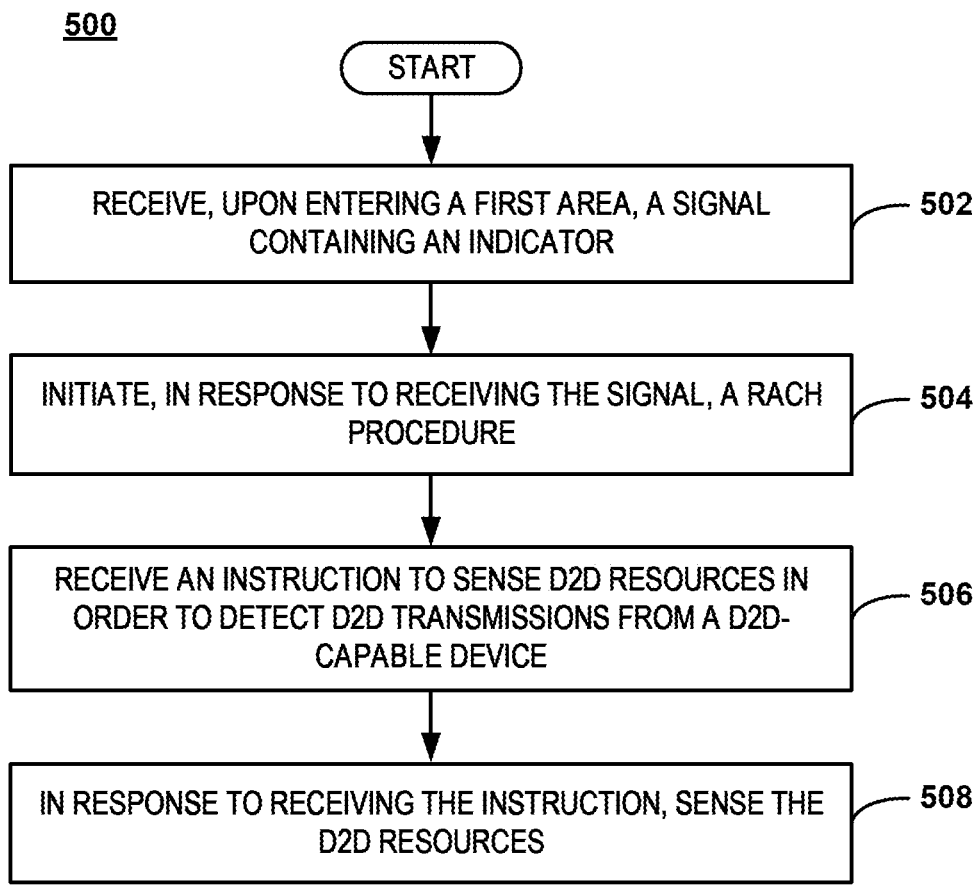
FIG. 5 is a flowchart of an example of a method of receiving a signal containing an indicator and, in response, initiating a RACH procedure, receiving an instruction to sense D2D resources in order to detect D2D transmissions from a D2D-capable device, and sensing the D2D resources, in response to receiving the instruction.

FIG. 5 is a flowchart of an example of a method of receiving a signal containing an indicator and, in response, initiating a RACH procedure, receiving an instruction to sense D2D resources in order to detect D2D transmissions from a D2D-capable device, and sensing the D2D resources, in response to receiving the instruction. The method 500 begins at step 502 with wireless communication device (WCD) 106 receiving, upon entering first area 108, a signal 104 containing an indicator. At step 504, WCD 106 initiates, in response to receiving signal 104, a RACH procedure. At step 506, WCD 106 receives an instruction to sense D2D resources in order to detect D2D transmissions from a D2D-capable device. At step 508, WCD 106 senses, in response to receiving the instruction, the D2D resources in order to detect D2D transmissions 114 from D2D-capable device 110. In other examples, one or more of the steps of method 500 may be omitted, combined, performed in parallel, or performed in a different order than that described herein or shown in FIG. 5. In still further examples, additional steps may be added to method 500 that are not explicitly described in connection with the example shown in FIG. 5.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A first wireless communication device (WCD) comprising:
   a transmitter configured to transmit, to a first area, a signal containing an indicator; and a receiver configured to receive, from a second, mobile WCD that received the signal, a Random-Access Channel (RACH) procedure message, the transmitter further configured to transmit, in response to receiving the RACH procedure message, a safety message that indicates the presence of the second, mobile WCD, the safety message including location and heading information of the second, mobile WCD, and the transmitter is further configured to transmit, to a neighboring WCD, a request that the neighboring WCD transmits the safety message that indicates the presence of the second, mobile WCD.

2. The first WCD of claim 1, wherein the first WCD comprises at least one of the following: a base station, a local remote radio head (RRH), a road-side unit (RSU), and a device-to-device (D2D)-capable device.

3. The first WCD of claim 1, wherein the signal is part of a Synchronization Signal Block (SSB) transmission.

4. The first WCD of claim 1, wherein the signal is a System Information Block (SIB) message.

5. The first WCD of claim 1, wherein the signal is transmitted within a beam directed to the first area.

6. The first WCD of claim 1, wherein the RACH procedure message is a Radio Resource Control (RRC) Connection Request message.

7. The first WCD of claim 1, wherein the transmitter is further configured to transmit the safety message before the second, mobile WCD reaches a second area.

8. A mobile wireless communication device comprising:
a receiver configured to receive, upon entering a first area, a signal containing an indicator;
a controller configured to initiate, in response to receiving the signal, a Random-Access Channel (RACH) procedure,
the receiver further configured to receive an instruction to transmit a device-to-device (D2D) safety message, the D2D safety message including location and heading information of the mobile wireless communication device; and
a transmitter configured to transmit, in response to receiving the instruction, the D2D safety message using D2D resources.

9. The mobile wireless communication device of claim 8, wherein the signal is received from at least one of the following: a base station, a local remote radio head (RRH), a road-side unit (RSU), and a D2D-capable device.

10. The mobile wireless communication device of claim 8, wherein the signal is part of a Synchronization Signal Block (SSB) transmission.

11. The mobile wireless communication device of claim 8, wherein the signal is a System Information Block (SIB) message.

12. The mobile wireless communication device of claim 8, wherein the signal is transmitted within a beam directed to the first area.

13. The mobile wireless communication device of claim 8, wherein the instruction to transmit the D2D safety message is received during the RACH procedure.

14. The mobile wireless communication device of claim 13, wherein the instruction to transmit the D2D safety message is received in a Radio Resource Control (RRC) Connection Setup message.

15. The mobile wireless communication device of claim 8, wherein the instruction to transmit the D2D safety message is a scheduling instruction received while the mobile wireless communication device is in a CONNECTED state.

16. The mobile wireless communication device of claim 15, wherein the D2D safety message is transmitted using a Mode 1 sidelink resource allocation.

17. The mobile wireless communication device of claim 8, wherein the transmitter is further configured to transmit the D2D safety message before the mobile wireless communication device reaches a second area.

18. A mobile wireless communication device comprising:
a receiver configured to receive, upon entering a first area, a signal containing an indicator; and
a controller configured to initiate, in response to receiving the signal, a Random-Access Channel (RACH) procedure,
the receiver further configured to:
receive an instruction to sense device-to-device (D2D) resources in order to detect D2D transmissions from a D2D-capable device,
in response to receiving the instruction, sense the D2D resources, detect, on the sensed D2D resources, a safety message including location and heading information of the D2D-capable device, and receive the safety message.

* * * * *